UNITED STATES PATENT OFFICE 2,013,600

ARTICLES WHICH MUST HAVE A REDUCED TENDENCY TO RUST

Karl Carius, Dortmund, Germany, assignor to the firm Vereinigte Stahlwerke Aktiengesellschaft, Dusseldorf, Germany No Drawing. Application May 8, 1930, Serial No. 450,878. In Germany May 11, 1929

4 Claims. (Cl. 75—1)

It is the object of the present invention to provide a corrosion resisting steel or a corrosion resisting cast iron with a material containing such amounts of carbon, silicon, manganese, phosphorus, and sulphur which are usual for steel and cast iron, i. e. with a steel containing such appreciable amounts of said constituents which are usually present in technical iron and containing for instance up to about 1.3% of silicon. In the case of cast iron also the usual amounts of said constituents are present.

It is known that an addition of copper to the steel or cast iron in quantities of 0.2–0.3% or more, in some cases, increases the resistance to corrosion in the atmosphere as well as in acid waters. In spite of the extensive research carried out in this field, the action of the copper or the mechanism of the reaction respectively which by its presence influences the process of corrosion, is still unknown. Furthermore, there is still much controversy in connection with the question of increased resistance to corrosion in neutral (sea or river) water.

Experiments of the inventors have shown that, with an addition of copper to the steel or cast iron respectively, the action inhibiting the rusting process is based upon the following fundamental conditions. The corrosion products which form in the solution in the course of the rusting process consist of divalent and trivalent iron ions the concentration of which is determined by the solubility product of the hydroxides. This consant relation of the concentration of the ions confers on the corroding agent an oxidation potential whose magnitude of $E_h = +0.54$ volts is a measure of the oxidizing power of the solution. Under the action of this oxidizing power of the solution copper oxidized aside of the iron, and it goes into solution, yet, due to the presence of iron, will be immediately precipitated and retained as a precipitate. According to the conditions responsible for the discharging as well as the crystallization process of the copper ions, the formation of a more or less continuous and covering coating of copper or copper oxide will be brought about, as is the case in distilled water, rain-water as well as in the rusting process in the atmosphere, or spongy copper will be precipitated as it has been observed in diluted aqueous salt solutions.

The finely divided spongy copper that is present in intimate contact with the iron causes the formation of numerous local elements: copper-irons whose action consists in the formation as well as in the accumulation of green coloured ferrous hydroxide. This formation of ferrous hydroxide will be further enhanced by the reduction of trivalent iron to divalent iron which is forcibly associated with the oxidation process of the copper. The ferrous hydroxide is present as a tough, strongly adhering gel and, due to the fact that it forms with sufficient rapidity owing to the action of the local elements, is as such capable of hardening under water in the way of gypsum and of becoming inpermeable to water so as to protect the steel surface against the access of water as well as further corroding attacks.

It has been found that the precipitation of a metal during the rusting process of iron with a subsequent formation of a coating of ferrous oxide protecting the base metal from the further attack by the corroding agent is not only caused by the presence of copper but also by the further element tin which also possesses an electrolytic potential less precious than the oxidation potential of the corroding agent and more precious than the electrolytic potential of iron. The present invention therefore provides for an addition of tin in amounts between about 0.05 and 5% with or without copper in a steel or cast iron material. The effect produced by the presence of said substance is already to be observed with very small amounts thereof. For instance a very favourable effect can be produced as small amount as with 0.1% tin or with a total content of copper and tin of at least 0.1%. The favourable effect is still further enhanced by raising the additions somewhat above said limit.

On the stability, however, of the impermeable protective coating some limit is being imposed by the fact that the oxygen of the solution will gradually oxidize the coating to granular and permeable black coloured rust ($FeO \cdot Fe_2O_3$) and then to brown coloured rust ($Fe_2O_3$). The passages, holes and fissures thus formed in the coating of ferrous hydroxide affect its protective action and are capable of even neutralizing it, temporarily. The invention therefore suggests to add to the iron material containing the additions already mentioned a small amount of a further metal whose oxidation products cannot be further oxidized by virtue of their chemical condition and which, in consequence of their viscous, gel-like consistency stick to the porous, spongy precipitates, harden under water and become impermeable, the deleterious action of the holes and fissures caused by the oxidation of the coating of ferrous hydroxides is being neutralized so that the protective action remains intact.

More particularly, according to the invention, aluminum and magnesium are used in addition to the alloying elements already mentioned.

The desired action will be obtained by relatively small additions of aluminum which amount, for example, to 0.05–0.5%. A higher percentage will also have its influence without, however, affording special advantages in connection with steels. Yet this limitation does not apply to cast iron with which maximum protection will be obtained between 0.5 to 5%, depending upon the other constituents, though also in this case, from an aluminum contact of 0.05% upwards a protective action will be obtained which is technically valuable.

Magnesium is used in amounts between about 0.1 and 5%. The magnesium content is preferably kept within the lower amount of said range so as to avoid an unfavorable influence upon the mechanical properties of the alloys.

Thus the invention comprises a composition of matter for the manufacture of articles having a reduced tendency to rust even when attacked by water, especially seawater and moist soil, or the so manufactured articles themselves respectively composed of an iron composition, steel or cast iron with the usual accompanying elements, such as carbon, phosphorus, manganese, silicon, in the usual amounts, containing tin in amounts between about 0.05 and 5% and preferably also copper in amounts from a trace up to 1% together with magnesium in amounts between about 0.1 and 5%. The balance of the alloys consists substantially of iron. If articles composed in such a manner are exposed to the action of a corroding agent, such as seawater or moist soil, they will react with the agent during the first period of its action by forming corrosion products upon their outer surface. Said corrosion products are caused by the electrochemical phenomena already described and form a strongly adherent coating upon the articles which prevents their further attack by the corroding agent, so that they are proof against corrosion in that state, though the material of which they are composed is not a stainless material in its first condition before the corroding agent acted upon it.

This protective action resulting from the addition of the mentioned metals will also be maintained if the steel or cast iron, for some other reasons, is alloyed with the usual amounts of elements such as for example manganese, silicon, phosphorus, chromium, tungsten, molybdenum, cobalt, boron, zirconium, beryllium.

Having thus described my invention what I claim as new and desire to secure by Letters Patent is:

1. A composition of matter for the manufacture of articles having a reduced tendency to rust even when attacked by water, especially sea-water and moist soil, comprising a cast iron or steel, containing tin in amounts from about .05 to 5%, said tin being characterized by the fact that it possesses an electrolytic potential which is less precious than the constant oxidation potential of the corroding agent, but more precious than the electrolytic potential of the steel or cast iron and forming a strongly adherent rust inhibiting coating during the corrosion process due to said electro-chemical quality, and containing, in addition to such elements, magnesium in amounts from about .1 to 5% the balance of the alloy consisting substantially of iron.

2. A composition of matter for the manufacture of articles having a reduced tendency to rust even when attacked by water, especially sea-water and moist soil, comprising a cast iron or steel, containing about 1% of copper, and tin in amounts from about .05 to 5%, said tin being characterized by the fact that it possesses an electrolytic potential which is less precious than the constant oxidation potential of the corroding agent, but more precious than the electrolytic potential of the steel or cast iron and forming a strongly adherent rust inhibiting coating during the corrosion process due to said electrochemical quality, and containing in addition to such elements magnesium in amounts from about .1 to 5% the balance of the alloy consisting substantially of iron.

3. A composition of matter for the manufacture of articles having a reduced tendency to rust even when attacked by water, especially sea-water and moist soil, comprising a cast iron or steel, containing tin in amounts from about .05 to 5%, said tin being characterized by the fact that it possesses an electrolytic potential which is less precious than the constant oxidation potential of the corroding agent, but more precious than the electrolytic potential of the steel or cast iron and forming a strongly adherent rust inhibiting coating during the corrosion process due to said electro-chemical quality, and containing in addition to such elements small amounts of at least one further alloying element whose oxidation products cannot be further oxidized and which have a viscous gel-like consistency, said group comprising magnesium and aluminum, the balance of the alloy consisting substantially of iron.

4. A composition of matter for the manufacture of articles having a reduced tendency to rust even when attacked by water, especially sea-water and moist soil, comprising a cast iron or steel, containing about 1% of copper, and tin in amounts from about .05 to 5%, said tin being characterized by the fact that it possesses an electrolytic potential which is less precious than the constant oxidation potential of the corroding agent, but more precious than the electrolytic potential of the steel or cast iron and forming a strongly adherent rust inhibiting coating during the corrosion process due to said electrochemical quality, and containing in addition to such elements small amounts of at least one further alloying element whose oxidation products cannot be further oxidized and which have a viscous gel-like consistency, said group comprising magnesium and aluminum the balance of the alloy consisting substantially of iron.

KARL CARIUS.